3,563,756
COATING COMPOSITIONS CONTAINING
A COATING AID
George M. Gantz, Upper Saddle River, N.J., E. Scudder Mackey, Binghamton, N.Y., and Raymond L. Mayhew, Summit, N.J., assignors to GAF Corporation, a corporation of Delaware
No Drawing. Filed June 23, 1967, Ser. No. 648,217
Int. Cl. G03c 1/38
U.S. Cl. 96—114.5                                        8 Claims

ABSTRACT OF THE DISCLOSURE

A coating composition and a photographic support coated therewith said coating composition comprising a water-permeable colloid and a coating aid therein comprising a small amount of at least one compound of the following structural formula:

wherein R represents an aliphatic hydrocarbon chain containing from 8 to 20 carbons and X is selected from the group consisting of hydrogen and a water solubilizing cation.

---

This invention relates to coating compositions comprising water-permeable colloids and more particularly to gelatin coating compositions advantageously adapted for use in connection with high-speed coating methods.

As is commonly recognized in the coating industry, it is highly desirable if not essential that water-permeable colloid, e.g., gelatin-containing coating compositions be capable of application at relatively high coating speeds and that the layers so deposited be of uniform and selected physical characteristics. The foregoing requirements are of primary import in operations associated with the preparation of photographic film elements. In ideal terms, coating aids adapted specifically for use in compositions of the afore-described type and especially those containing substantial proportions of gelatin should be possessed of a number of properties. Among such properties there may be mentioned the following:

(1) uniform quality, properties, etc. from batch to batch;
(2) enable the use of high speed coating operations both in wet-on-wet and wet-on-dry coatings;
(3) devoid of any tendency to impart streakiness or repellency to the water-permeable colloid;
(4) exhibit minimal sludge and/or foam formation;
(5) provide coatings having little or no tendency to slip;
(6) be non-photoactive . . . etc.

Heretofore, considerable difficulty has been encountered in connection with attempts to provide water-permeable colloid layers of the desired characteristics and especially when employing coating speeds consonant with feasible commercial operation as well as satisfactory product throughput.

With reference to gelatin coating compositions, for example, it has been ascertained that the absence of coating aid provides, invariably, coated layers which exhibit manifold defects including e.g., the presence of numerous crescent-shaped uncoated areas commonly referred to as repellency spots, such defects approximating the size of a pin head with streaks or other such irregularities emanating from the points of the crescent and proceeding in a direction opposite to that of the coating. It is not unusual in such cases to find that lightly coated areas of 5 to 10 mm. in diameter will result.

In an effort to overcome or otherwise mitigate the foregoing and related disadvantages, the art has resorted to the use of a variety of coating aids. Saponin, for example, in spite of its relatively widespread use with gelatin coating compositions in particular has nevertheless proved somewhat objectionable. Although yielding a relatively uniform and even coating, this material, being of natural origin, may often vary markedly from batch to batch in quality, composition, purity and the like to the extent that one or more of the properties considered essential to the provision of a commercially acceptable photographic emulsion product may be deleteriously affected.

As a direct result of the foregoing situation, considerable attention has been focused on the use of synthetic coating aids selected from a wide variety of surfactant materials of the anionic, cationic and/or nonionic types including for example, the taurides, betaines, imidazolinium salts and the like. Since materials of this type may be subjected to rather precise conditions of manufacture, problems associated with variations in quality, composition, purity or the like are eliminated substantially. However, despite the manifold advantages attending to the use of the synthetic type coating materials heretofore provided, such materials have nevertheless proved unsatisfactory in a number of important respects. As particular examples of the more significant problems repeatedly encountered with the use of the latter materials and especially in connection with the preparation of photographic layers containing gelatin, there may be mentioned their tendency to produce streakiness and repellency spots which cannot be readily rewet with the consequent condition that the product layer tends to form "air bells" on the emulsion surface during photographic processing. Such areas will often manifest themselves in the form of relatively small, undeveloped areas in the processed film product. Such conditions arise due to the incapability of the developer composition to penetrate the emulsion layer in such areas. Such defects not only detract from the viewing quality of the image bearing layer to the extent that in some instances retouching is required, but more importantly, can be dangerously misleading when present on certain types of films particularly medical or industrial X-ray films.

A further source of difficulty noted to attend the use of the coating aids thus far provided in the art relates to their tendency to react with the hardening and/or fixing solutions customarily employed with automatic processing machines. Such fugitive reactions result in the formation of sludge-like deposits or precipitates which of course are highly objectionable for the reasons hereinbefore stated.

Problems of the foregoing types become increasingly manifest with "wet-on-wet" coating methods, the latter involving the application of the water-permeable colloid composition to a wet substrate. This is a matter of prime commercial importance and particularly with reference to plural coating operatings, i.e., involving the deposition of two or more layer-forming compositions on a common base, since it is vital to economical processing to eliminate or at least minimize any necessity for intermediate drying operations and thus the time which would otherwise be consumed thereby.

The coating aids or surface active materials, i.e., surfactants thus far made available to the art, however, are to a great extent, somewhat deficient for use with wet-on-wet coating techniques. Thus, it becomes necessary to dry an applied layer prior to the deposition of an additional layer thereupon.

Thus, a primary object of the present invention resides in the provision of improved gelatin-containing coating compositions advantageously adapted for application to either wet or dry surfaces utilizing high speed coating techniques in the virtual absence of skipping.

Another object of the present invention resides in the provision of coating aids advantageously adapted for use with light sensitive photographic silver halide emulsions to facilitate the attainment of coatings which are uniform and repellency-free without deleteriously affecting the emulsion.

A further object of the present invention resides in the provision of coating aids advantageously adapted for incorporation into photographic gelatin-containing coating compositions such agents being totally devoid of any tendency to react with any of the ingredients contained in the processing solutions associated with post-exposure, image-forming development.

Other objects and advantages of the present invention will become more apparent hereinafter as the description proceeds.

The attainment of the foregoing objects is made possible in accordance with the present invention which in its broader aspects includes the provision of improved water-permeable colloid coating compositions and coated elements prepared therewith and wherein such compositions contain as an essential ingredient a relatively small amount of a coating aid comprising a surfactant compound of the following general formula:

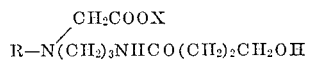

wherein R represents an aliphatic hydrocarbon chain of from 8 to 20 carbon atoms, e.g., octyl, decyl, dodecyl, tridecyl, tetradecyl, pentadecyl, heptadecyl, etc. and X represents hydrogen or a water-solubilizing cation such as alkali metal, e.g., sodium, potassium, lithium, ammonium, substituted ammonium wherein one or more hydrogen atoms is replaced by alkyl, hydroxyalkyl, etc.

The compounds embraced by the above illustrated structural formula may be readily and easily prepared by reacting a fatty acid propylene amine with butyrolactone and sufficient chloroacetic acid to react with the total amine hydrogen present in the starting material. The fatty acid propylene amine derivatives contemplated for use herein may be selected from a wide variety of materials readily available commercially. Particularly beneficial results are obtained in accordance with the present invention wherein the amine is obtained from coconut, soybeans, tallow and the like.

Although specific reference would be made to gelatin throughout the present description, the term water-permeable colloid as used herein is to be understood as encompassing water-soluble and/or dispersible materials whose aqueous solutions yield water-permeable films on drying. As examples of substances falling within this definition there may be mentioned in particular and without necessary limitation, water-soluble cellulose esters of lactic or glycolic acid, partially hydrolyzed polyvinyl acetate, modified polyvinyl alcohol, water-soluble polyvinyl acetals, and the like. The colloid material may be suitably provided in the form of an aqueous dispersion, emulsion, suspension, etc. such as would be the case with polymers derived from the polymerization of one or more acrylate polymers, e.g., ethyl acrylate, methyl acrylate, methyl methacrylate, etc. The foregoing materials are conventionally provided in latex form by the use of suitable emulsifying agent, suspending agents and the like.

In accordance with the discovery forming the basis of the present invention it has been ascertained that the improvements may possibly by use of the coating aids described herein be readily obtained despite their employment in relatively small quantities, i.e., on the order of 0.001% by weight and lower based on the total weight of the coating solution. Particularly beneficial results are noted to obtain with the use of the coating aid in concentrations ranging from about 0.1% to 0.25% by weight of the coating composition. It will be understood of course that in some circumstances it may be advisable to utilize concentrations falling without the aforestated ranges the propriety of any such departures being dictated solely by the requirements of the processor as well as the ultimate use contemplated for the coating composition in question. Thus in this sense, the aforestated concentration values are to be understood as encompassing those particular ranges found to assure the obtention of optimum results regardless of the nature of the coating application involved. By way of example, should the gelatin coating composition in question be contemplated for use as a direct additive to a photographic silver halide composition it is usually advisable to maintain gelatin concentrations ranging from about 2% to about 10% by weight of the total composition with a range of 6% to 8% being preferred. Correspondingly, the amount of coating aid employed will ordinarily range from about 0.1% to about 5% by weight upon the dry weight of the gelatin or other hydrophilic colloid employed for such purposes. Expressed in terms of coated area, coating aid concentrations found to be highly efficacious for use herein range from about 1 to about 50 mg. per square ft. since 1 kg. of gelatin, dry basis, will usually provide coverage for approximately 1,000 sq. ft. of surface.

For the vast majority of applications, it has been ascertained that the aforedescribed concentration values are optimum whether the coating aid be incorporated directly into the light-sensitive silver halide emulsion composition or alternatively into one or more of the auxiliary layers, e.g., surface layers. Heretofore, the application to silver halide emulsion layers of aqueous gelatin surface layer compositions has been attended by severe spreading and skipping such problems becoming significantly more pronounced at higher web coating speeds. Since the provision of feasible coating methods advantageously adapted to high speed techniques has been extremely problematical, the improvements provided by the coating aids of the present invention are of especial significance since they are uniquely adaptable to high speed coating operations.

The photographic emulsions prepared utilizing the coating aids described herein are ordinarily comprised of an aqueous solution of gelatin containing as the light-sensitive material, a light-sensitive silver halide, e.g., silver bromide, silver chloride, silver iodide as well as mixtures thereof. The emulsion in question may be of the non-optically sensitized, panchromatic or X-ray type. During actual emulsion preparation, the coating aid may be included either before or after the addition of any of the conventional emulsion addenda, e.g., sensitizing dyes, hardeners, etc.

The coating method employed may be any of those promulgated in the art for such purposes. For example, the substrate to be coated may simply be passed through a trough or reservoir containing the coating solution, e.g., gelatin, light-sensitive silver halide, etc. The coating may be applied to greater thickness than desired ultimately and thereafter subjected to the action of suitable levelling means such as a doctor blade or an air knife which causes run-back of the coating composition thereby resulting in the obtention of an even and uniform surface. In some instances, the coating method employed may involve a hopper technique in which the thickness of the layer is regulated by the rate at which the coating composition is deposited upon the base support the latter being transported adjacent thereto.

The following examples are given for purposes of illustration only and are not to be considered as necessarily constituting a limitation on the present invention.

EXAMPLE I

With each of the following samples, the coating composition comprises a gelatin silver halide photographic emulsion of the medical X-ray type having a silver concentration of approximately 35 grams per kg. of emulsion and a gelatin concentration of approximately 70 grams per kg. of emulsion. The emulsion composition thus prepared is divided into two samples identified as (a) and (b)

respectively. To sample (a) is added 0.5% by weight of saponin as coating aid. To sample (b) is added 0.2% by weight as coating aid of the following compound:

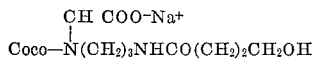

Each of samples (a) and (b) is coated onto a cellulose acetate film support via the doctor blade techniques. With sample (a), it is observed that an intolerable degree of skipping occurs at a web coating speed of approximately 45 feet per minute. In contradistinction, with sample (b), it is found that web coating speeds up to 95 feet per minute and higher may be effectively employed in the absence of skipping. In evaluating the quality of the coating obtained, the term "repellencies" is often employed, such term referring to the number of uncoated spots per 3 sq. ft. of coating area. Utilizing this criteria, it is found that sample (a) yields a coating having a repellency value most accurately characterized as being gross. This connotes an extremely high order of repellency population density the significance of such condition being made readily manifest by reefrence to the fact that the minimum number of repellencies detected was on the order of 10. By way of comparison, the coated layer yielded by sample (b) was completely devoid of repellencies or for that matter, any type of coating irregularity. Moreover, the photographic properties characterizing sample (b) are found to be vastly superior exhibiting upon photographic exposure and processing, excellent speed, contrast, density, etc. in the virtual absence of fog.

As mentioned hereinbefore, the coating aids of the present invention provide exceptional advantage with regard to plural or multiple coating operations involving the application to a silver halide photographic emulsion layer of one or more overcoating layers formulated with a hydrophilic colloid such as, e.g., antistatic layer, antiabrasion layer, etc. The improvements in this connection will be made readily evident from the following example:

EXAMPLE II

Emulsion-coated film base samples are prepared exactly as described in Example I. A coating composition comprising a 4% aqueous gelatin solution containing 0.4% of a conventional tauride coating aid is thereafter coated directly upon each of samples (a) and (b) as surface layers. As was the case in Example I, with sample (a), coating speeds in excess of 45 feet per minute are found to produce intolerable skipping thereby resulting in the production of a high population density of repellencies as well as other coating, defects, e.g., streakiness, air bells. With sample (b) however, coating speeds on the order of 95 ft. per minute could be employed without skipping or in any way adversely affecting the coating quality of the gelatin composition. Moreover, despite the high coating speed employed, the gelatin surface layer adhered exceptionally well while the general coating appearance was eminently satisfactory.

EXAMPLES III and IV

Examples I and II are repeated except that the N—CoCo ampholyte is replaced by an equivalent amount of the following compound.

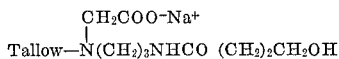

The results obtained are similar to those described in Examples I and II, i.e., the N-tallow coating aid of the present invention provides a high quality coating completely devoid of repellencies or other irregularities which exhibits excellent strength of adhesion.

One of the truly significant advantages attending the use of coating aids described herein relates to the fact that they are beneficially adapted for photographic processing utilizing automatic processing machines displaying absolutely no tendency to form or otherwise contribute to the formation of precipitates, sludges, etc., the latter vitiating any possibility of obtaining a reproduction of acceptance quality. Thus, when the film samples described in the foregoing examples are subjected to photographic exposure and processing in high speed equipment, each of the samples containing the coating aid of the present invention was of exceptional purity being totally free from stain or other deposits resulting from precipitation or sludging. By way of comparison, the film samples containing the conventional coating aid materials, i.e., saponin and tauride, were marred by the presence of spurious stain. As previously mentioned, sludge formation results from the tendency of the coating aid material to react with the ingredients present in one or more of the post-exposure processing solution, such fugitive effects being particularly obnoxious as a result of emergence in aluminum, hardening-fixing solutions. As is well known, combined hardener-fixer are conventionally employed with processing involving the use of automatic machines.

Improvements similar to those described above are obtained when the gelatin carrier is replaced wholly or partly with one or more water-permeable colloids such as the water-soluble cellulose esters of lactic or glycolic acid, partially hydrolyzed polyvinyl acetate, modified polyvinyl alcohol, water-soluble acetals, etc.

In addition, it is found that hydrophilic colloid-containing coating compositions containing the coating aids of the more conventional variety such as the taurides, protein condensation products of fatty acids, polyoxyalkylenated derivatives of long chain fatty acids, alcohols, etc. may be synergistically modified to advantage by including therein one or more of the coating aids provided by the present invention.

The coating aids of the present invention likewise find advantageous utility in the preparation of photographic film elements designed for color reproduction such as silver halide emulsions containing one or more color coupler materials, e.g., those provided with a solubilizing sulfo or carboxy groups. Couplers of this type are described for example in U.S. Pats. 2,186,734; 2,445,252; 2,530,349; 2,671,021; 2,524,725; 2,354,552 and 2,547,537. Alternatively, the coupler material may be of the non-diffusing type which may be incorporated into silver halide emulsions in the form of a solution or mixture of high boiling and low boiling solvents. Such coupler compounds are well known in the art being extensively described in the literature both patent and otherwise.

Although the present invention has been described with reference to the preparation of photographic silver halide emulsions, it will be understood that the coating compositions described herein may comprise simply a mixture of gelatin with one or more of the coating aid materials. Compositions so constituted find utility in a wide variety of applications and may be applied as such to any number of substrate materials for purposes of providing a suitable protective overcoat. For example, such compositions may be utilized to advantage as protective coatings for papers, plastics, e.g., films of cellulose nitrate, cellulose ester, e.g., cellulose acetate, cellulose acetate butyrate, etc.; synthetic organic polymeric film-forming materials such as polyesters, polycarbonates, polystyrene and the like. Furthermore, they may be applied in the form of antiabrasion layers, antistatic layers, etc. The proportion of gelatin employed in compositions intended for use as auxiliary, i.e., non-sensitized layers in photographic elements is usually somewhat reduced, i.e., on the order of 2–3% by weight of the total coating solution, as compared with photographic silver halide emulsions wherein somewhat larger proportions of gelatin are usually required. In general, it has been found that the effective coating speed may be increased with correspondingly increased proportions of coating aid regardless of the proportion of gelatin present.

The present invention has been disclosed with respect to certain preferred embodiments thereof and there will become obvious to persons skilled in the art various modifications, equivalents or variations thereof which are

What is claimed is:

1. A coating composition comprising a water-permeable colloid and a coating aid therein comprising a small amount of at least one compound of the following structural formula:

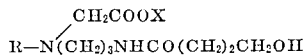

wherein R represents an aliphatic hydrocarbon chain containing from 8 to 20 carbons and X is selected from the group consisting of hydrogen and a water solubilizing cation.

2. A composition according to claim 1, wherein R represents a tallow radical.

3. A coating composition according to claim 1, wherein R represents a coco radical.

4. A composition according to claim 1, wherein said coating aid comprises from 0.001% to 0.25% by weight of the coating composition of a compound having the structural formula as described in claim 1.

5. An article of manufacture comprising a support coated with the composition of claim 1.

6. An article of manufacture according to claim 5, wherein said base comprises cellulose acetate.

7. A photographic silver halide emulsion containing therein as a coating aid a small amount of a compound of the following structural formula:

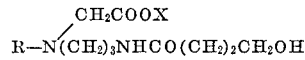

wherein R represents an aliphatic hydrocarbon chain containing from 8 to 20 carbons and X is selected from the group consisting of hydrogen and a water solubilizing cation.

8. A multilayer light-sensitive photographic element containing at least one light-sensitive silver halide emulsion layer, said element containing a small amount of a coating aid comprising a compound of the following structural formula:

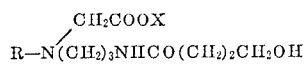

wherein R represents an aliphatic hydrocarbon chain containing from 8 to 20 carbons and X is selected from the group consisting of hydrogen and a water solubilizing cation.

References Cited

UNITED STATES PATENTS 3,113,026   12/1963   Sprung _____ 96—114.5
3,441,413   4/1969    Nishio et al. _____ 96—114.5

NORMAN G. TORCHIN, Primary Examiner

J. R. HIGHTOWER, Assistant Examiner

U.S. Cl. X.R.

106—135